United States Patent
Hatfield et al.

(10) Patent No.: US 8,423,712 B2
(45) Date of Patent: *Apr. 16, 2013

(54) METHODS AND SYSTEMS FOR RELEASING AND RE-ALLOCATING STORAGE SEGMENTS IN A STORAGE VOLUME

(75) Inventors: Brian D. Hatfield, Tucson, AZ (US); Kurt A. Lovrien, Tucson, AZ (US); Oladimeji O. Omoniyi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,771

(22) Filed: May 8, 2012

(65) Prior Publication Data
US 2012/0226886 A1   Sep. 6, 2012

Related U.S. Application Data

(63) Continuation of application No. 12/859,137, filed on Aug. 18, 2010.

(51) Int. Cl.
*G06F 12/00* (2006.01)
*G06F 13/00* (2006.01)

(52) U.S. Cl.
USPC .................. 711/112; 711/147; 711/E12.002

(58) Field of Classification Search .............. 711/112, 711/147, E12.002
See application file for complete search history.

(56) References Cited

U.S. PATENT DOCUMENTS

| | | | |
|---|---|---|---|
| 6,237,079 B1 | 5/2001 | Stoney | |
| 7,130,960 B1 | 10/2006 | Kano | |
| 7,685,396 B2 | 3/2010 | Sze et al. | |
| 2007/0266037 A1 | 11/2007 | Terry et al. | |
| 2008/0320061 A1 | 12/2008 | Aszmann et al. | |
| 2009/0077327 A1* | 3/2009 | Hara | 711/154 |
| 2009/0144496 A1 | 6/2009 | Kawaguchi | |
| 2009/0182959 A1 | 7/2009 | Rao | |
| 2009/0240880 A1 | 9/2009 | Kawaguchi | |
| 2010/0042802 A1 | 2/2010 | Helman et al. | |
| 2010/0077173 A1 | 3/2010 | Rao et al. | |
| 2010/0241820 A1* | 9/2010 | Pelts et al. | 711/170 |

* cited by examiner

*Primary Examiner* — Edward Dudek, Jr.
(74) *Attorney, Agent, or Firm* — Griffiths & Seaton PLLC

(57) ABSTRACT

Storage segments in a storage volume coupled to a cache memory are released and re-allocated. A processor receives notice to release a segment allocated to the storage volume. A release pending status is assigned to the segment while preparing the segment for release. The storage volume is enabled to re-claim the segment while the segment includes the release pending status.

16 Claims, 3 Drawing Sheets

METHODS AND SYSTEMS FOR RELEASING AND RE-ALLOCATING STORAGE SEGMENTS IN A STORAGE VOLUME

CROSS-REFERENCE TO RELATED APPLICATIONS

This application is a Continuation of U.S. patent application Ser. No. 12/859,137, filed Aug. 18, 2010.

FIELD OF THE INVENTION

The present invention relates in general to data storage systems, and more particularly to methods and systems for releasing and re-allocating storage segments in a storage volume.

DESCRIPTION OF THE RELATED ART

Modern storage controllers provide thin provisioning features that allocate storage space the first time data is written to a storage volume. It is also desirable for hosts to request that storage controllers to subsequently release all or part of the space in the volume. Once the space is released, new writes to the released space again trigger the storage controllers to allocate the space. In contemporary storage systems, this sequence of allocate, release, and re-allocate can take longer than it otherwise could.

SUMMARY OF THE INVENTION

Various embodiments provide methods for releasing and re-allocating storage segments in a storage volume within a storage system. One method embodiment comprises receiving notice to release a segment allocated to the storage volume. The embodiment further comprises assigning a release pending status to the segment while preparing the segment for release. Here, the release pending status is assigned to the segment until the segment is released. Furthermore, the embodiment comprises enabling the storage volume to re-claim the segment while the segment includes the release pending status.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
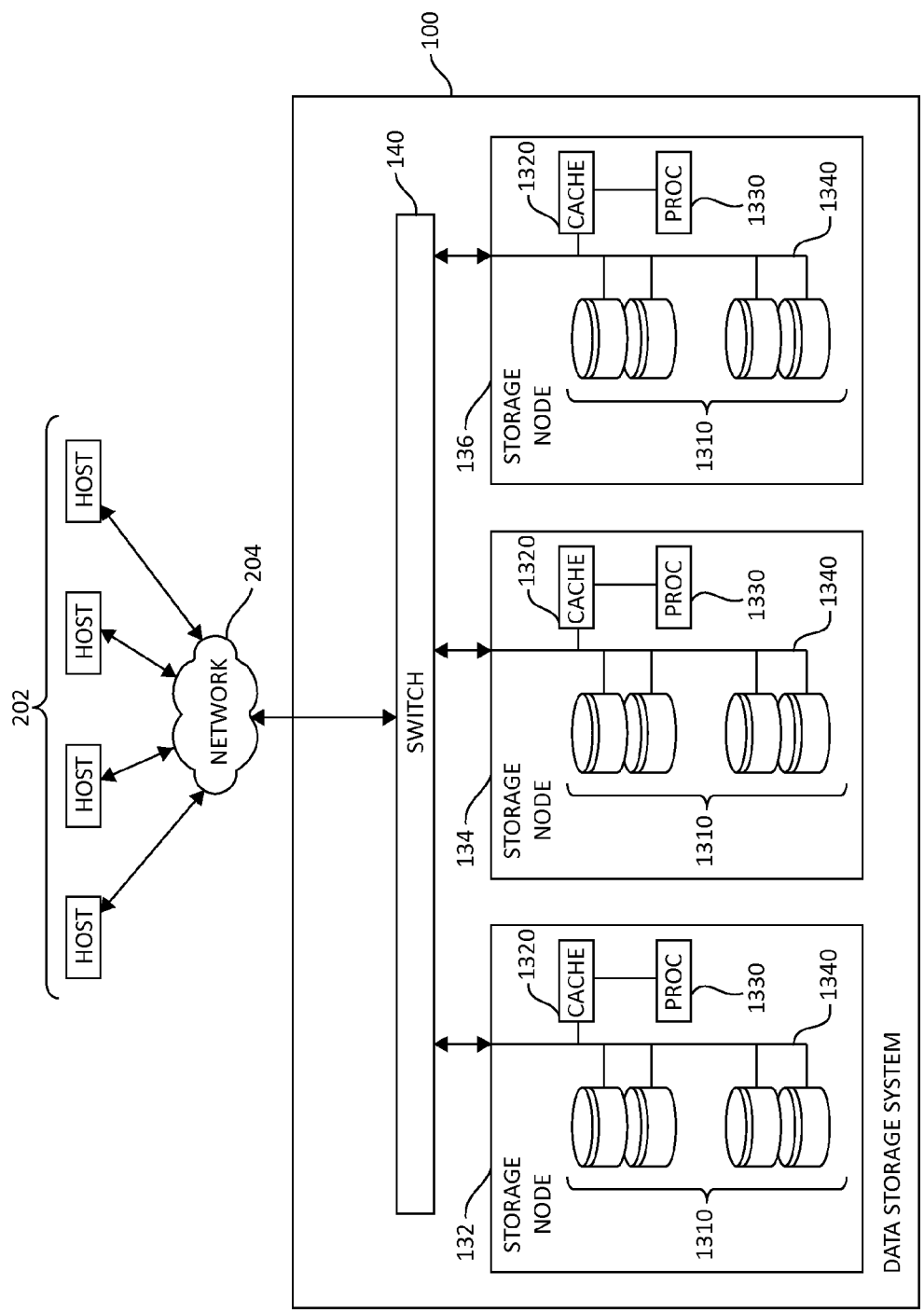
FIG. 1 is a block diagram of one embodiment of a system for releasing and re-allocating storage segments.

Reference is now made to FIG. 1, which is a schematic block diagram of a storage system 100, according to one embodiment of the present invention. Storage system 100 provides data storage for one or more hosts 202, which are coupled to storage system 100 by a network 204 (e.g., the Internet, a local area network (LAN), a wide area network (WAN), and/or by a bus). Storage system 100 typically operates in, or as at least a portion of, a network attached storage (NAS) or a storage area network (SAN) system. However, it will be understood that the scope of the embodiments presented herein is not limited to storage systems operating in any particular configuration. Rather, the scope of the embodiments presented herein includes systems operating in any suitable configuration used for storing data.

Storage system 100 comprises one or more storage nodes 132, 134, and 136 coupled to network 204 via a switch 140. Although FIG. 1 illustrates storage system 100 comprising three (3) nodes, system 100 may include any number of nodes greater than zero (0). Of note, nodes 132, 134, and 136 are distinguished from each other to indicate that storage system 100 may include a plurality of nodes (i.e., two or more nodes) that operate in substantially the same manner.

Nodes 132, 134, and 136 each comprise a set of physical storage devices 1310 and a cache memory 1320 coupled to a processor 1330 via a bus 1340. Each set of physical storage devices 1310 comprises multiple slow access and/or fast access, non-volatile mass storage devices (e.g., hard disks, tape devices, optical devices, magnetic devices, etc.). Furthermore, each physical storage device 1310 is capable of being partitioned into a plurality of rank segments (or physical segments) for storing data received from one or more of hosts 202. The rank segments can be allocated to storage volumes (or logical volumes) and/or volume segments (logical segments) addressable to one or more of hosts 202.

Cache 1320 (e.g., Random Access Memory (RAM)) may be any type of cache device known in the art or developed in the future. That is, cache 1320 may be any device capable of providing a fast source of recently accessed data.

In one embodiment, each processor 1330 is configured to create one or more storage volumes with one or more of physical storage devices 1310. Each processor 1330 is further configured to partition each physical storage device 1310 to include one or more rank segments for storing the data received from host(s) 202. Each created rank segment is initially designated with a "not allocated" status, which enables a storage volume or a volume segment to request allocation of rank segments including the "not allocated" status.

Each processor 1330, in various embodiments, is configured to allocate, release, and reallocate data space in the volume(s) within the respective sets of physical storage devices 1310. That is, each processor 1330 is configured to allocate segments to the storage volumes of physical storage devices 1310 and/or volume segments after the storage volumes and volume segments have been created. Specifically, each processor 1330 is configured to receive segment allocation requests for particular rank segments from the storage volume(s) and/or volume segment(s). If the rank segment(s) is/are available (i.e., include a "not allocated" status), processors 1330 are configured to allocate the rank segment(s) to the requesting storage volume or volume segment. In the event that the rank segment(s) is/are unavailable (i.e., include an "allocated" status or a "release pending" status (discussed below)), processors 1330 are configured to deny allocation of the rank segment(s) to the requesting storage volume or volume segment, with one exception discussed below.

In various embodiments, each processor 1330 is configured to "harden" (or destage) metadata associated with a particular rank segment when a storage volume no longer needs to store data in the particular rank segment. Each processor 1330 is configured to designate rank segments that are in the process of being hardened or destaged with a "release pending" status. In various embodiments, each processor 1330 is configured to prevent all storage volumes and volume segments from requesting re-allocation of rank segments that include a "release pending" status except the storage volume or volume segment that was associated with the rank segment prior to releasing the rank segment (i.e., the storage volume or volume segment that requested release of the rank segment). That is, each processor 1330 is configured to enable the particular storage volume or volume segment that was previously associated with the rank segment that is being released to reclaim the rank segment that was allocated to the particular storage volume or the particular volume segment prior to the rank segment being fully released. In other words, the previously associated storage volume or volume segment has the option and/or priority to reclaim the rank segment being released prior to the rank segment being fully released by processor 1330. In one embodiment, processors 1330 provide a predetermined amount of time during which the previously associated storage volume or volume segment has the option and/or priority to reclaim the rank segment being released prior to the rank segment being fully released by processor 1330. At the expiration of the predetermined amount of time, processors 1330 are configured to fully release the rank segment.

In various embodiments, each processor 1330 is configured to re-allocate rank segments to the storage volumes of physical storage devices 1310 and volume segments after the rank segments have been fully released. That is, each processor 1330 is configured to designate each fully released rank segment with the "not allocated" status, which enables any storage volume or volume segment to request allocation of the fully released rank segments (i.e., any rank segment with the "not allocated" status).

The following example may be helpful in understanding the operation of system 100. Of note, the following example is intended to illustrate the operation of one embodiment of system 100 and does not limit the various other embodiments of system 100.

After processor(s) 1330 have created one or more volumes each comprising a plurality of storage segments, storage system 100 receives an input/output (I/O) command from one of hosts 202. The I/O command is a write command to, for example, write data at one or more rank segments on the storage volume(s) in physical storage devices 1310 of one of nodes 132, 134, and 136.

Upon receipt of the write command, a storage volume in one of physical storage devices 1310 in, for example, node 132 requests the processor 1330 in node 132 to allocate a particular rank segment to the storage volume. If the particular rank segment includes a "not allocated" status, processor 1330 will allocate the particular rank segment to the storage volume (hereafter "the associated storage volume") and provide the particular rank segment with an "allocated" status, which prevents all other storage volumes and volume segments from accessing the particular rank segment.

When the associated storage volume receives an indication that the data in the particular rank segment no longer needs to be stored, the associated storage volume notifies processor 1330 that the particular rank segment needs to be released. Processor 1330, upon receipt of the release notification from the associated storage volume, will designate the particular rank segment with a "release pending" status and will begin hardening (or destaging) the metadata representing the particular rank segment.

If, while the particular rank segment includes the "release pending" status (i.e., is being destaged), the associated storage volume desires to store data in the particular rank segment, the associated storage volume will transmit a reclaim request to processor 1330. Upon receipt of the reclaim request, processor 1330 will re-allocate the particular rank segment to the associated storage volume and once again provide the particular rank segment with the "allocated" status. On the other hand, if a different storage volume (or a different volume segment within the associated storage volume) requests allocation of the particular rank segment while the particular rank segment includes the "release pending" status (i.e., is being destaged), processor 1330 will deny the request.

If, while the particular rank segment includes the "release pending" status (i.e., is being destaged) and/or during the predetermined time for reclaiming priority, the associated storage volume does not transmit a reclaim request to processor 1330, processor 1330 will fully release the particular rank segment and provide the "not allocated" status to the particular rank segment. With the "not allocated" status, any storage volume or volume segment can request and be allocated the particular rank segment.

Figure 2:
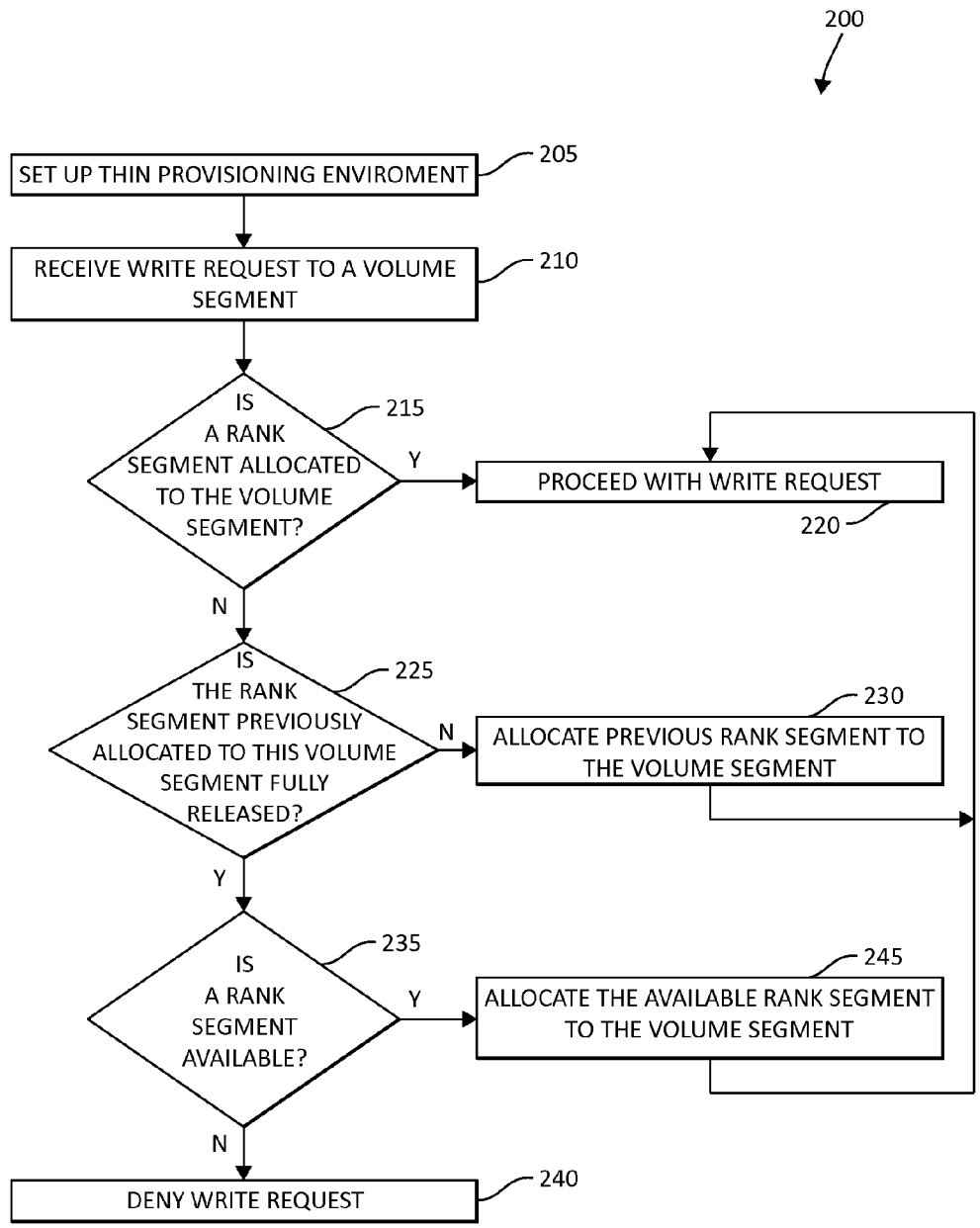
FIG. 2 is a flow diagram of one embodiment of a method for allocating storage segments in a storage system.

With reference now to FIG. 2, FIG. 2 is a flow diagram of one embodiment of a method 200 for allocating storage segments in a storage system (e.g., storage system 100). Method 200 begins by a processor (e.g., processor 1330) setting up a thin provisioning environment (block 205). Setting up a thin provisioning environment includes, but is not limited to, creating one or more storage volumes comprising one or more volume segments and creating one or more ranks comprising one or more rank segments.

After the thin provisioning environment is set up, method 200 includes processor 1330 receiving a write request to a particular volume segment (block 210). Processor 1330 then determines if a rank segment is allocated to the particular volume segment (block 215). If a rank segment is allocated to the particular volume segment, processor 1330 proceeds with processing the write request (block 220). If a rank segment is not allocated to the particular volume segment, processor 1330 determines if the rank segment is fully released (block 225).

If the rank segment is not fully released, the particular volume segment is allocated the previous rank segment (block 230) and processor 1330 proceeds with processing the write request (block 220). If the rank segment is fully released, processor 1330 determines if there is an available rank segment (block 235).

If there is not an available rank segment, processor 1330 denies the write request (block 240). If there is an available rank segment, processor 1330 allocates the particular volume segment to the available rank segment (block 245) and processor 1330 proceeds with processing the write request (block 220).

Figure 3:
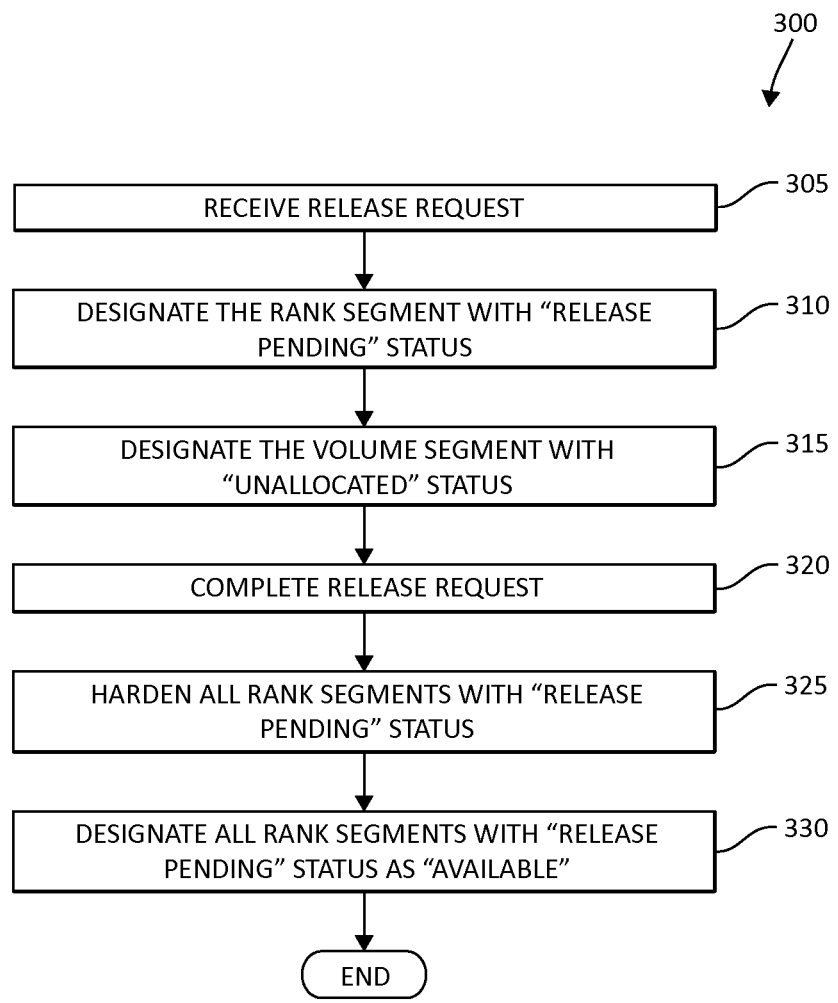
FIG. 3 is a flow diagram of one embodiment of a method for releasing rank segments associated with one or more volume segments.

Turning now to FIG. 3, FIG. 3 is a flow diagram of one embodiment of a method 300 for releasing rank segments associated with one or more volume segments. At least in the illustrated embodiment, method 300 begins with a processor (e.g., processor 1330) receiving a request to release a rank segment (block 305).

In response to the request to release the rank segment, processor 1330 designates the rank segment with a "release pending" status (block 310) and designates a volume segment associated with the rank segment with a "not allocated" status (block 315). After the rank segment has been designated with the "release pending" status and the volume segment has been designated with the "not allocated" status, processor 1330 completes the request to release the rank segment (i.e., releases the rank segment) (block 320).

After the rank segment has been released, processor 1330 hardens all of the rank segments that include the "release pending" status (block 325). After each of the rank segments has been hardened, processor 1330 designates all of the rank segments that had the "release pending" status as "available" for allocation (block 330). Notably, processor 1330 utilizes various background threads to harden all of the rank segments and designate the hardened rank segments as "available" for allocation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a computer-readable storage medium. A computer readable storage medium may be, for example, but not limited to, an electronic, magnetic, optical, crystal, polymer, electromagnetic, infrared, or semiconductor system, apparatus, or device, or any suitable combination of the foregoing. Examples (a non-exhaustive list) of computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Program code embodied on a computer-readable medium may be transmitted using any appropriate medium, including but not limited to wireless, wired, optical fiber cable, radio frequency (RF), etc., or any suitable combination of the foregoing. Computer program code for carrying out operations for aspects of the present invention may be written in any static language, such as the "C" programming language or similar programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for releasing and re-allocating storage segments in a storage volume coupled to a cache memory, the method comprising:
   receiving, by a processor, notice to release a segment allocated to the storage volume;
   assigning a release pending status to the segment while preparing the segment for release;
   enabling the storage volume to re-claim the segment while the segment includes the release pending status; and
   denying a reclaim request from another storage volume while the segment includes the release pending status.

2. The method of claim 1, further comprising:
   releasing the segment;
   removing the release pending status from the segment after releasing the segment; and
   enabling a different storage volume or the storage volume to claim the segment after removal of the release pending status.

3. The method of claim 1, further comprising:
   removing the release pending status for the segment;
   releasing the segment after removing the release pending status; and
   enabling a different storage volume or the storage volume to claim the segment after removal of the release pending status.

4. The method of claim 3, wherein the storage volume is able to re-claim the segment until the release pending status for the segment is removed.

5. The method of claim 1, further comprising releasing the segment after removing the release pending status for the segment, wherein the storage volume is able to re-claim the segment until the release pending status for the segment is removed.

6. The method of claim 1, further comprising:
   releasing the segment;
   removing the release pending status from the segment after releasing the segment; and
   enabling a different storage volume to claim the segment after removal of the release pending status.

7. The method of claim 6, wherein releasing the segment comprises releasing the segment after the release pending status for the segment is removed, wherein the storage volume is able to re-claim the segment until the release pending status for the segment is removed.

8. The method of claim 1, further comprising destaging metadata representing the segment while the segment includes the release pending status.

9. A method for releasing and re-allocating storage segments in a storage volume coupled to a cache memory, the method comprising:
   setting up a thin provisioning environment comprising a plurality of storage volumes including the storage volume and one or more ranks including one or more segments;
   receiving, by a processor device, a write request to the storage volume;
   determining, by the processor device, if a segment is allocated to the storage volume;
   processing the write request, if the segment is allocated to the storage volume;
   receiving, by the processor device, notice to release the segment allocated to the storage volume;
   assigning a release pending status to the segment while preparing the segment for release;
   enabling the particular storage volume to re-claim the segment while the segment includes the release pending status; and
   denying a reclaim request from another storage volume while the segment includes the release pending status.

10. The method of claim 9, further comprising:
    releasing the segment;
    removing the release pending status from the segment after releasing the segment; and
    enabling a different storage volume or the storage volume to claim the segment after removal of the release pending status.

11. The method of claim 9, further comprising:
    removing the release pending status for the segment;
    releasing the segment after removing the release pending status; and
    enabling a different storage volume or the storage volume to claim the segment after removal of the release pending status.

12. The method of claim 11, wherein the storage volume is able to re-claim the segment until the release pending status for the segment is removed.

13. The method of claim 12, further comprising releasing the segment after removing the release pending status for the segment, wherein the storage volume is able to re-claim the segment until the release pending status for the segment is removed.

14. The method of claim 9, further comprising:
    releasing the segment;
    removing the release pending status from the segment after releasing the segment; and
    enabling a different storage volume to claim the segment after removal of the release pending status.

15. The method of claim 14, wherein releasing the segment comprises releasing the segment after the release pending status for the segment is removed, wherein the storage volume is able to re-claim the segment until the release pending status for the segment is removed.

16. The method of claim 9, further comprising destaging metadata representing the segment while the segment includes the release pending status.

* * * * *